United States Patent [19]

Wu

[11] Patent Number: 5,767,445
[45] Date of Patent: Jun. 16, 1998

[54] DRAWER TYPE HARD DISKDRIVE BOX ASSEMBLY

[76] Inventor: Ching Hsiu Wu, No.35, Alley 13, Lane 512 Ming Tsu E. Road, Taipei, Taiwan

[21] Appl. No.: 554,504

[22] Filed: Nov. 7, 1995

[51] Int. Cl.⁶ .................................................. H02G 3/08
[52] U.S. Cl. .................. 174/52.1; 361/685; 361/759; 361/727
[58] Field of Search ..................... 174/52.1; 361/724, 361/725, 726, 727, 683, 685, 747, 759; 439/928.1, 374, 377

[56] References Cited

U.S. PATENT DOCUMENTS

| | | | |
|---|---|---|---|
| 4,941,841 | 7/1990 | Darden et al. | 439/477 |
| 4,954,928 | 9/1990 | Jullien | 361/391 |
| 5,010,426 | 4/1991 | Krenz | 361/725 |
| 5,171,183 | 12/1992 | Pollard et al. | 361/384 |
| 5,299,089 | 3/1994 | Lwee | 361/684 |
| 5,442,513 | 8/1995 | Lo | 361/685 |
| 5,563,767 | 10/1996 | Chen | 361/685 |
| 5,586,003 | 12/1996 | Schmitt et al. | 361/683 |

Primary Examiner—Kristine L. Kincaid
Assistant Examiner—Hung V. Ngo
Attorney, Agent, or Firm—Donald C. Casey, Esq.

[57] ABSTRACT

A drawer type hard diskdrive box assembly is described. The assembly includes a mounting frame, a casing covered with a cover frame and slidably mounted in the mounting frame to hold the diskdrive and a handle pivoted to the front side of the casing for carrying the same. The mounting frame has a spring latch for locking the handle when the casing is locked in the mounting frame and a movable dust board which is operative to close the mounting frame when the casing is removed from the mounting frame. The handle also has two pins at opposite ends which are stopped against stop edges of the mounting frame to force the casing outwards from the mounting frame when the handle is turned counter clockwise relative to the casing.

4 Claims, 10 Drawing Sheets

PRIOR ART

DRAWER TYPE HARD DISKDRIVE BOX ASSEMBLY

BACKGROUND OF THE INVENTION

The present invention relates to hard diskdrive boxes, and relates more particularly to a drawer type hard diskdrive box assembly which has latch means to lock the front handle when the casing is locked in the mounting frame, and a dust board to automatically close the mounting frame when the casing is removed from the mounting frame.

Figure 1:
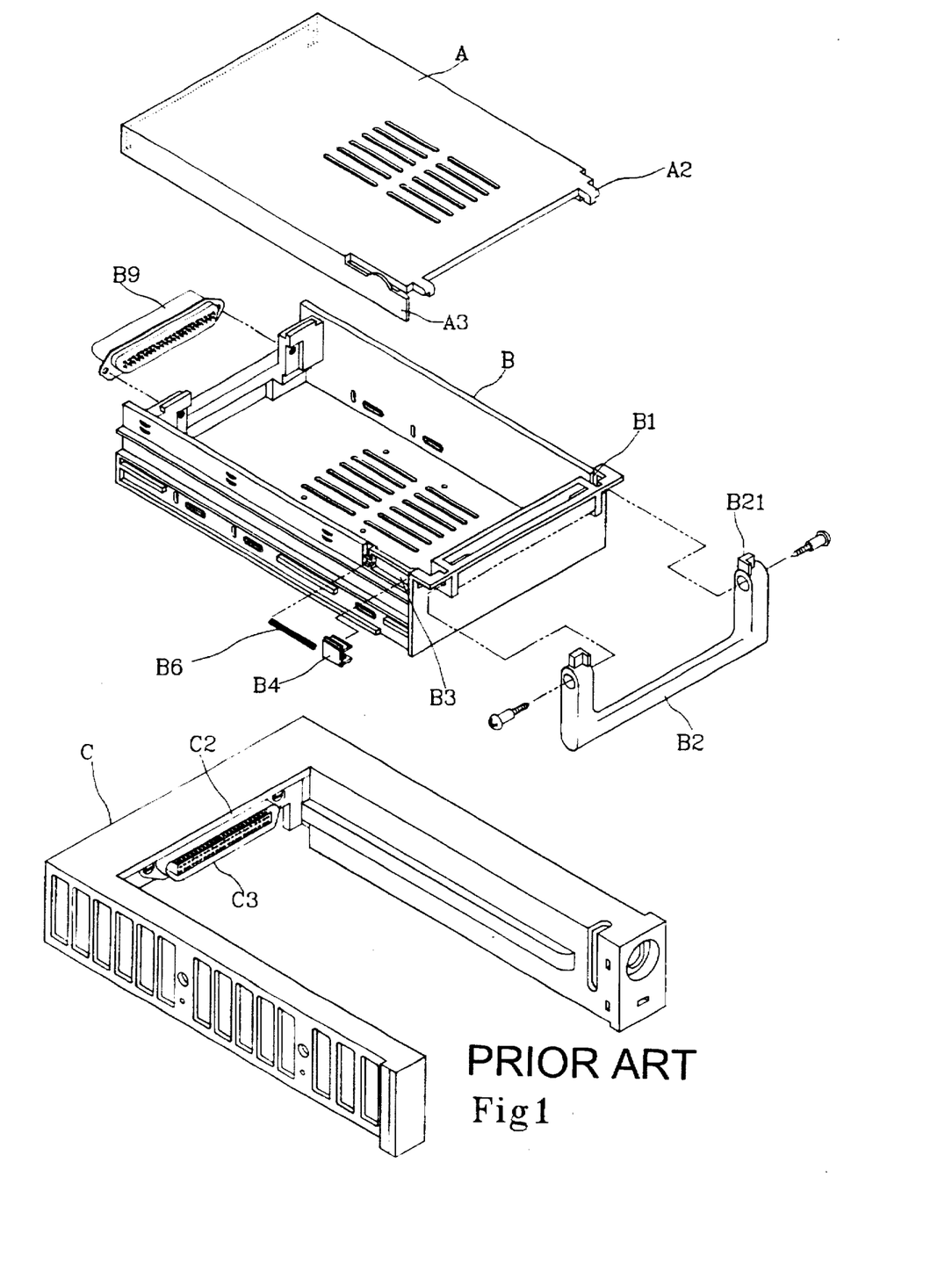
FIG. 1 is an exploded view of a drawer type hard diskdrive mounting box according to the prior art.
Figure 2:
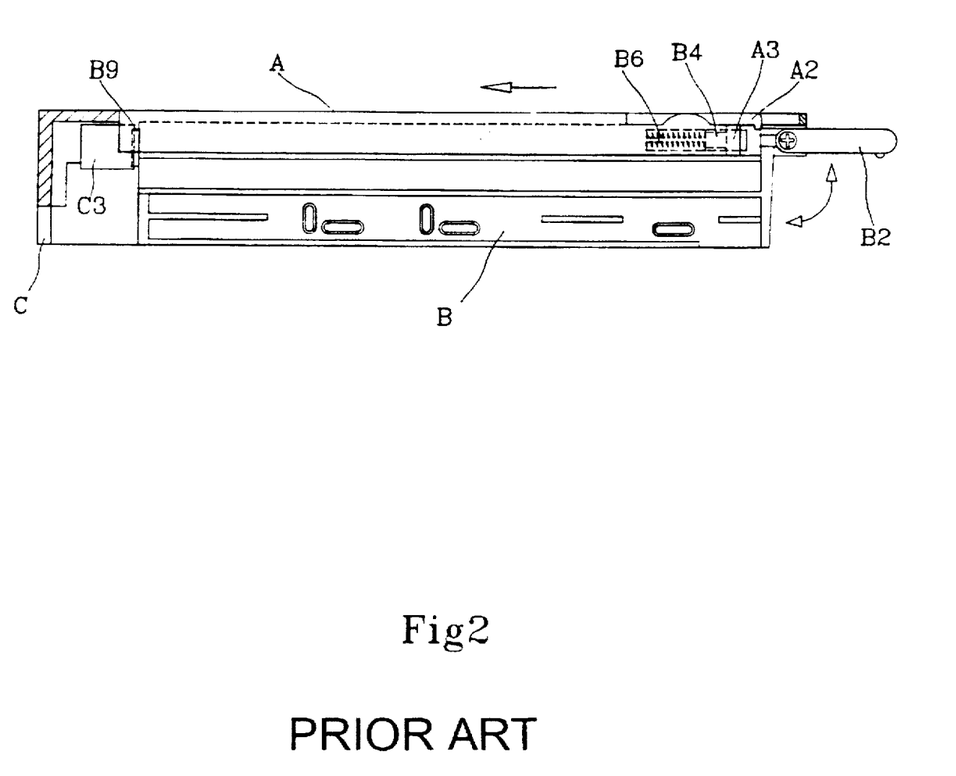
FIG. 2 is a sectional assembly view of the drawer type hard diskdrive mounting box shown in FIG. 1.
Figure 3:
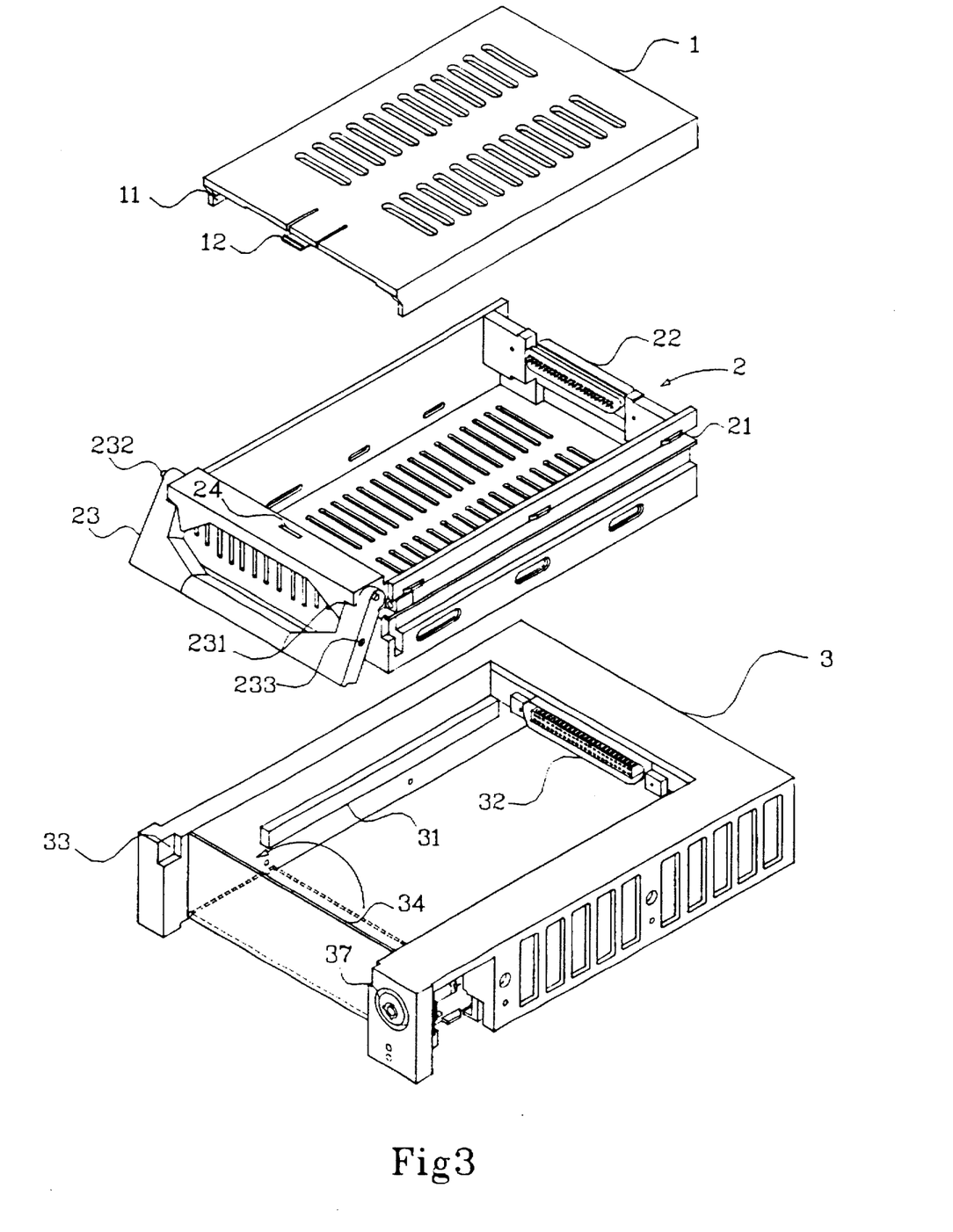
FIG. 3 exploded view of a drawer type hard diskdrive box assembly according to the present invention.
Figure 4:
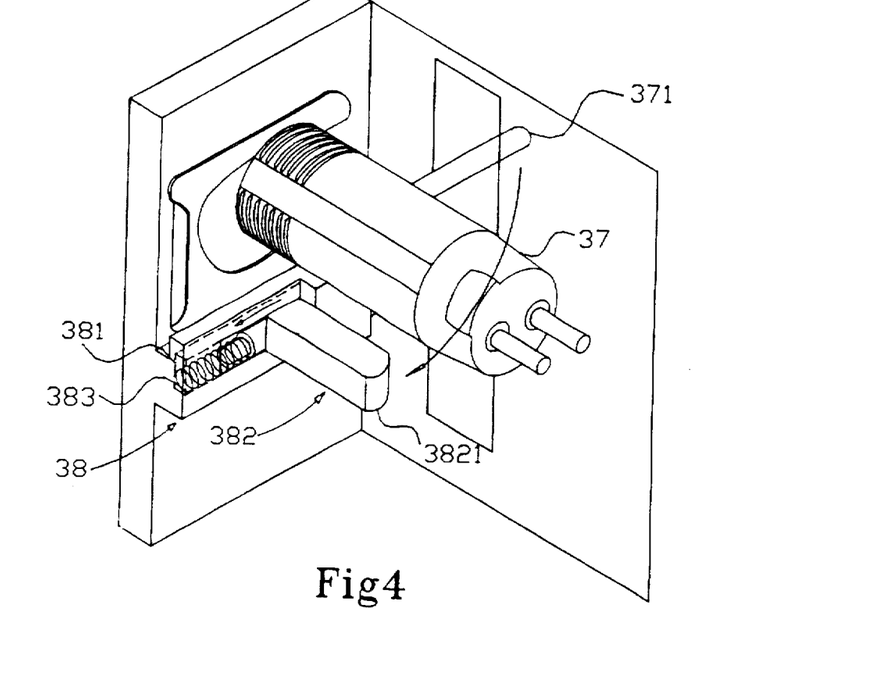
FIG. 4 is a perspective view of the lock and the latch assembly according to the present invention.
Figure 5:
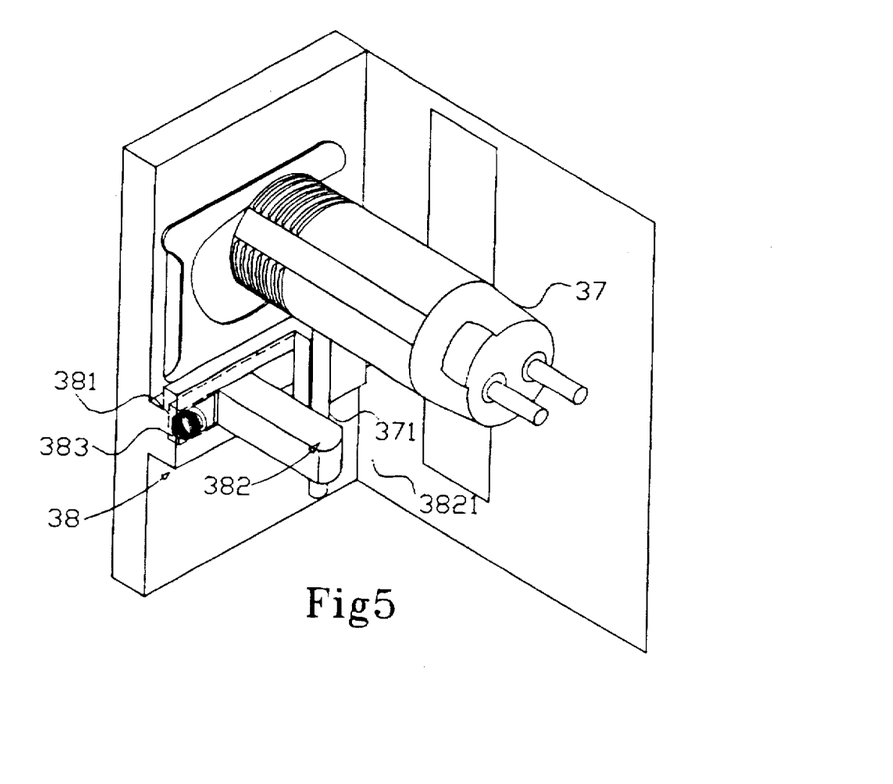
FIG. 5 is similar to FIG. 4 but showing the lock unlocked, and the latch assembly forced to the unlocking positions
Figure 6:
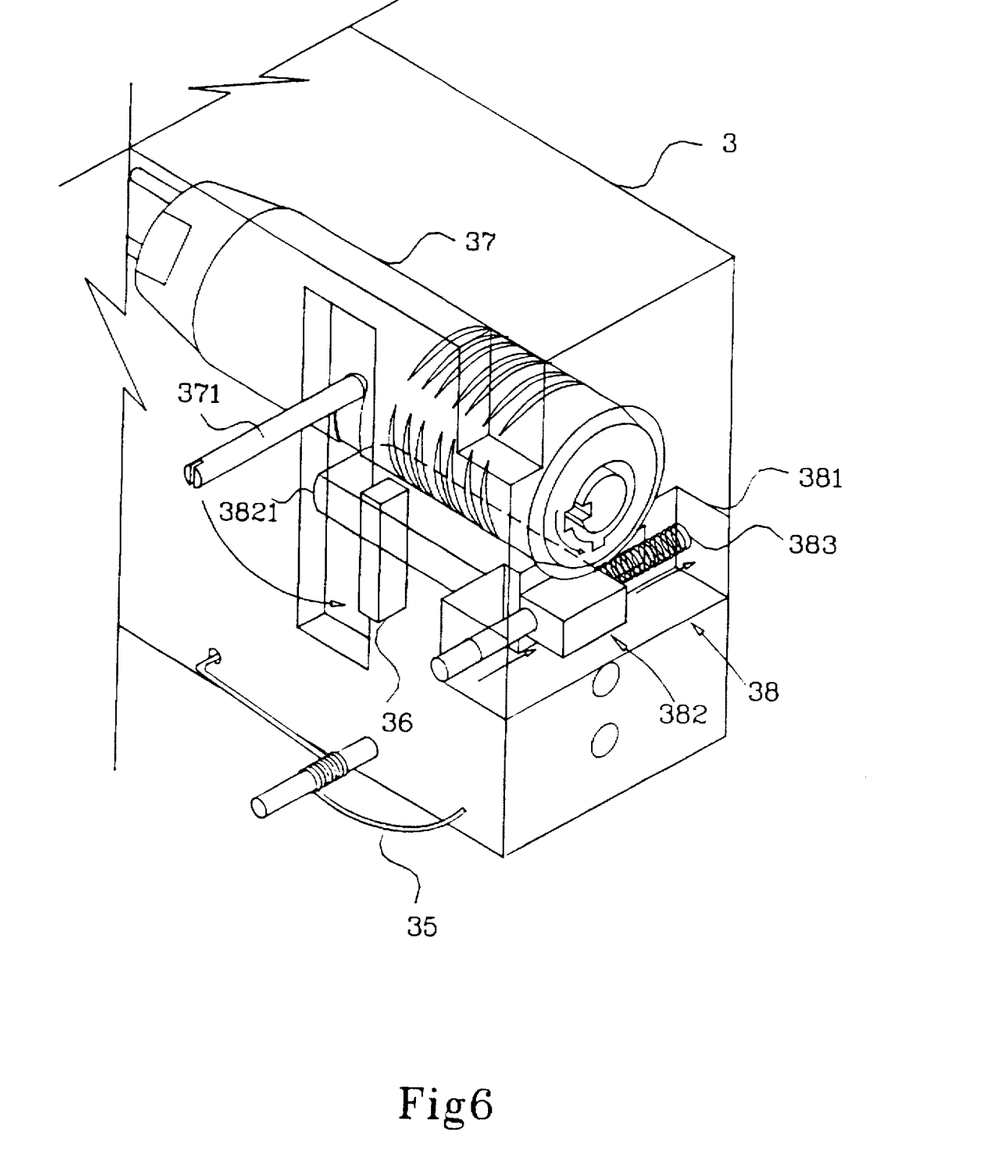
FIG. 6 is another perspective view of the lock and the latch assembly shown in FIG. 4 taken from another direction.
Figure 7:
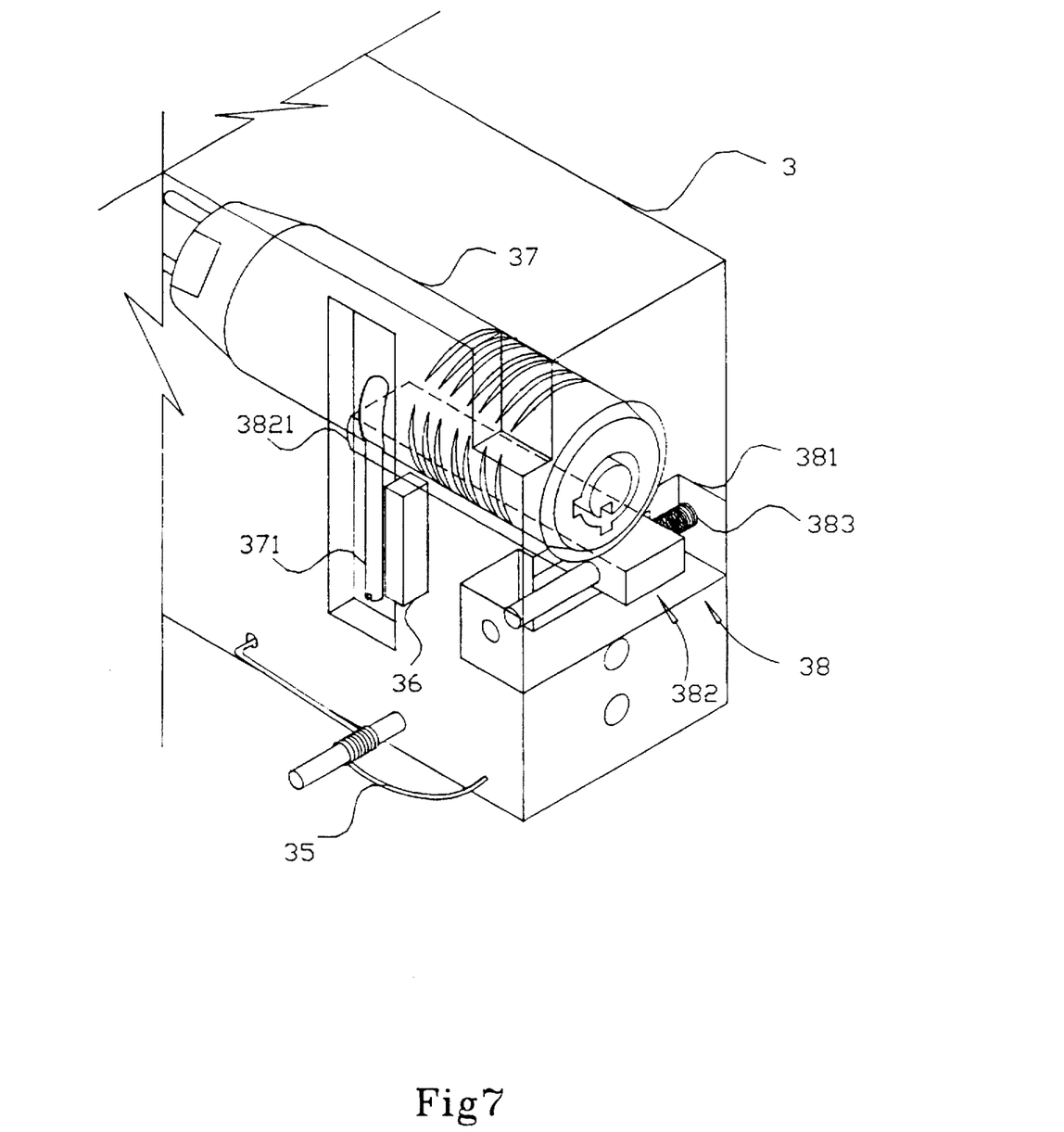
FIG. 7 is similar to FIG. 6 but showing the lock unlocked, and the latch assembly forced to the unlocking position.
Figure 8:
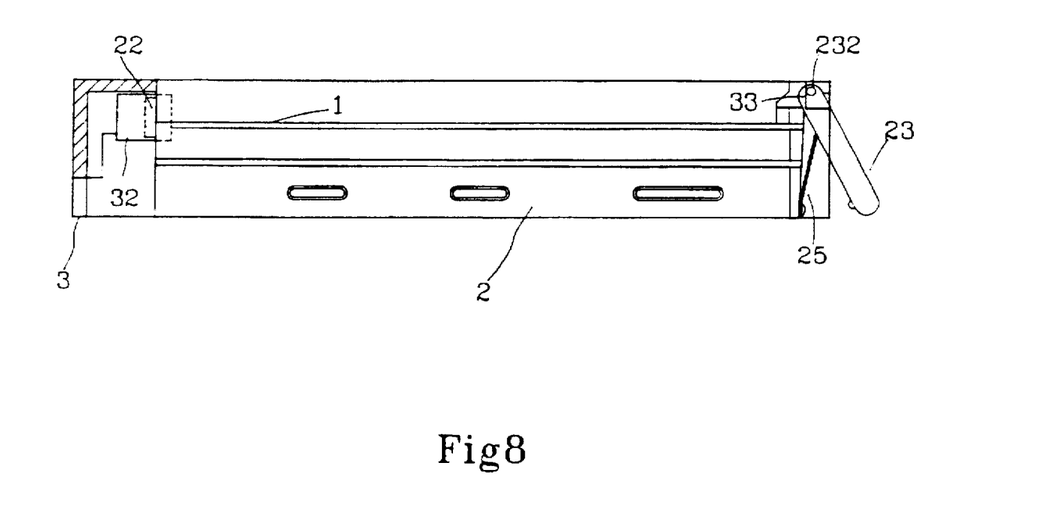
FIG. 8 is a side plain view of the drawer type hard diskdrive box assembly according to the present invention, showing the front handle forced outwards by the spring plate.
Figure 9:
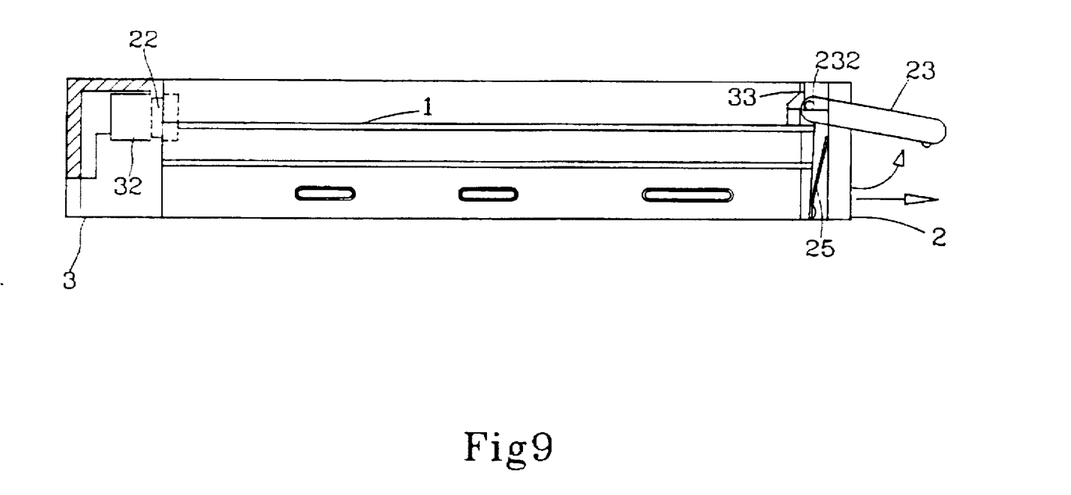
FIG. 9 is similar to FIG. 8 but showing the front handle turned upwards in the counter-clockwise direction.
Figure 10:
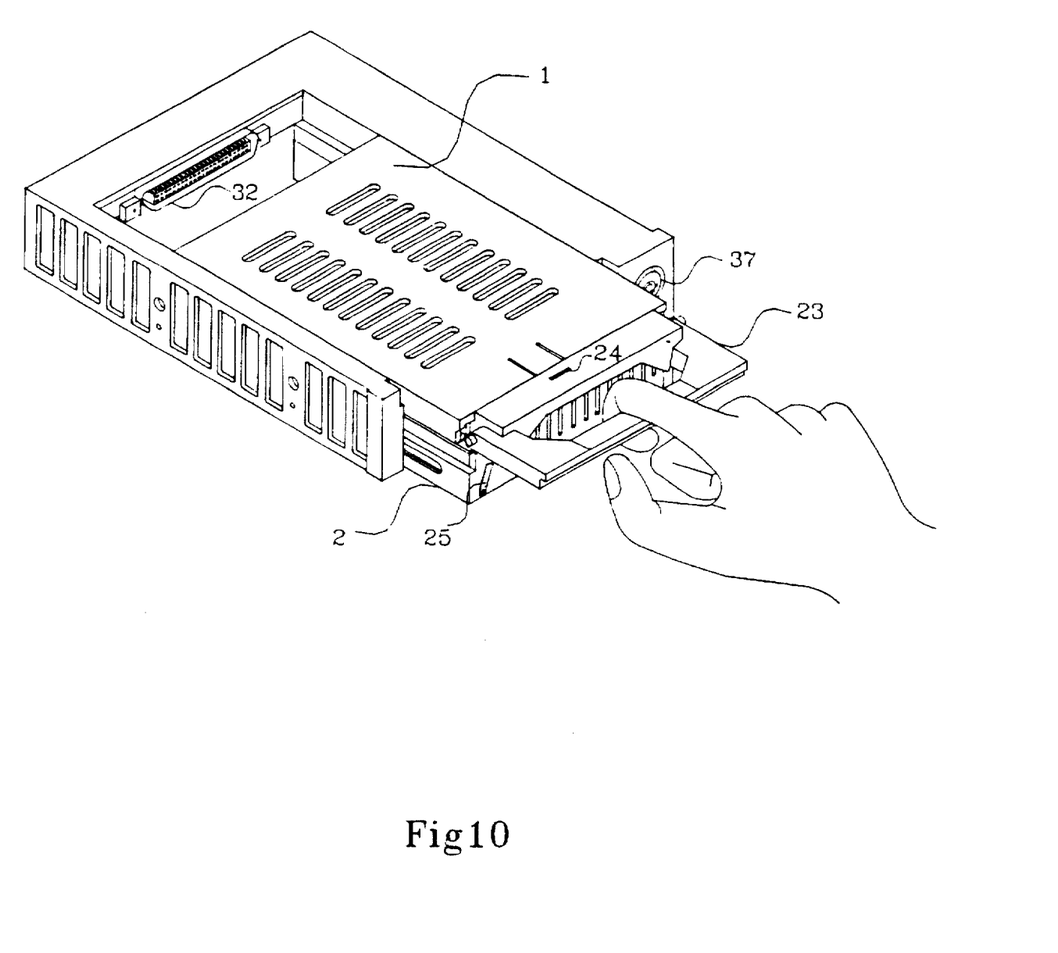
FIG. 10 is an elevational view of the drawer type hard diskdrive box assembly, showing the handle and the casing pulled out the mounting frame.
Figure 11:
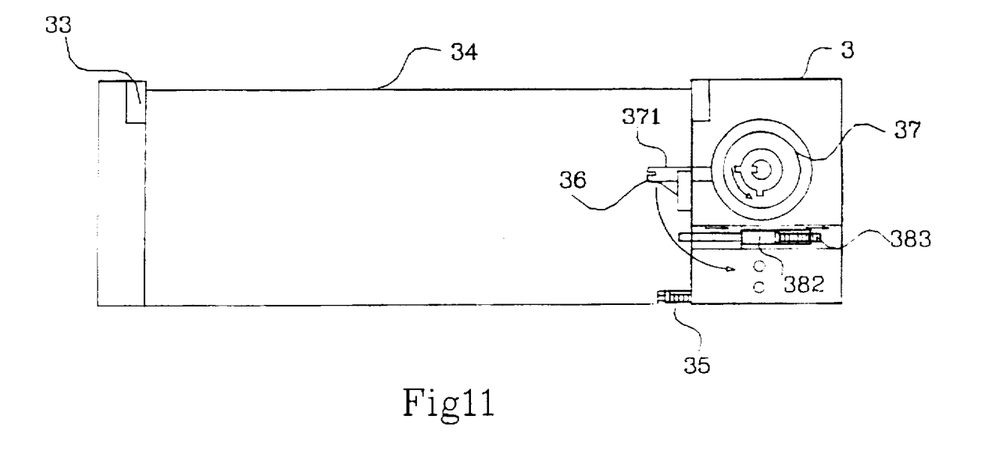
FIG. 11 is a front plain view of the mounting frame showing the lock and the latch assembly moved to the locking position
Figure 12:
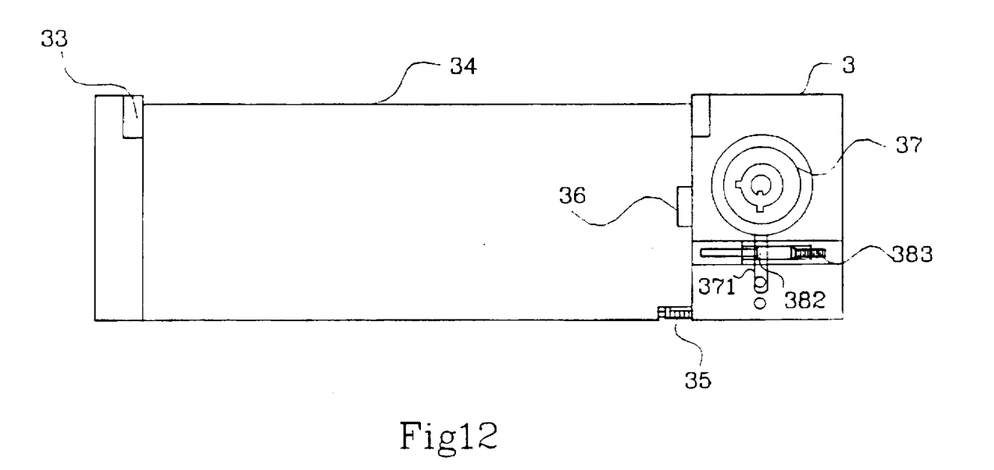
FIG. 12 is similar to FIG. 11 but showing the lock and the latch assembly moved to the unlocking position.
Figure 13:
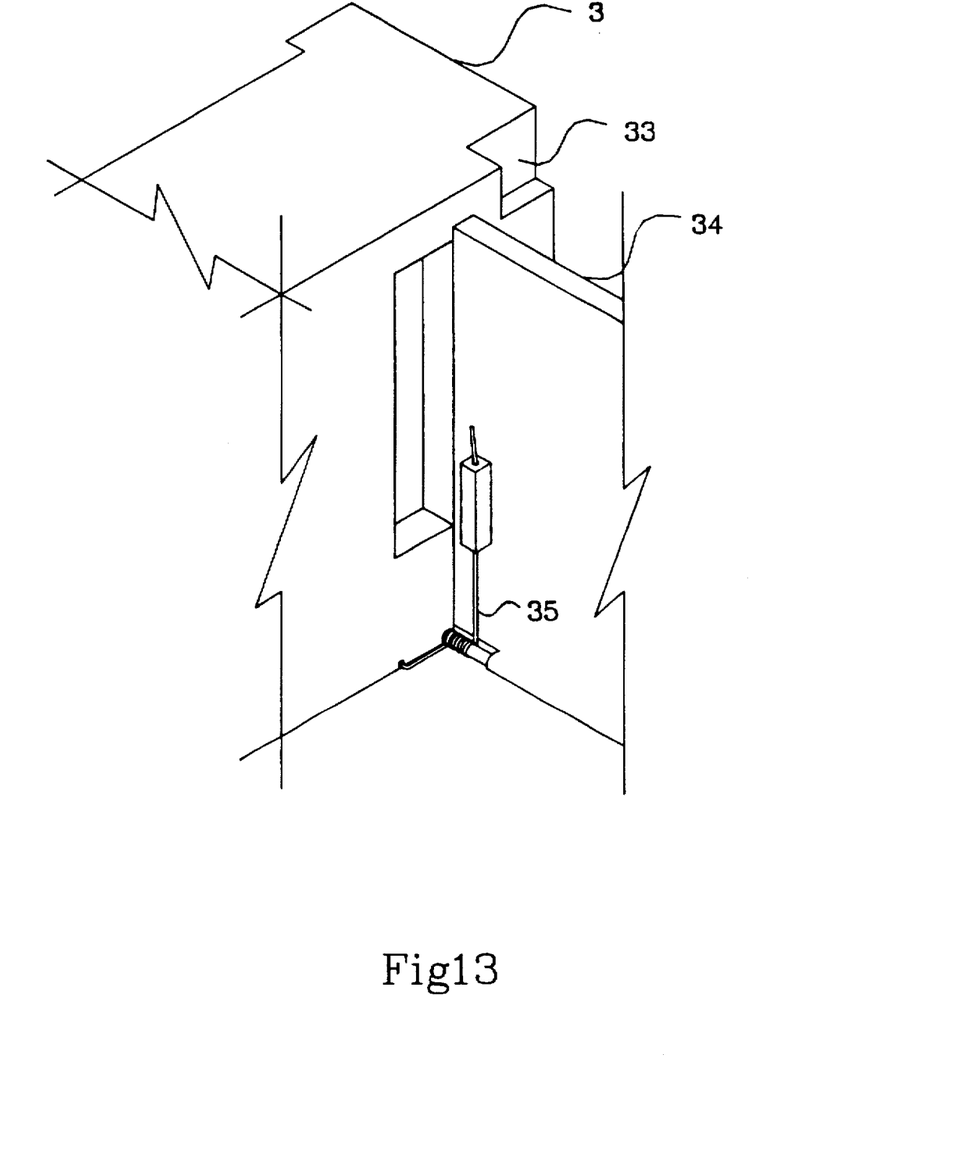
FIG. 13 is a partial view in an enlarged scale of the mounting frame according to the present invention, showing the dust board lifted.

FIGS. 1 and 2 show a drawer type hard diskdrive mounting box according to the prior art, which comprises a substantially U-shaped mounting frame C, a casing B moved in and out of the mounting frame C and having a front handle B2 turned between a vertical position closely attached to the casing B and a horizontal position perpendicular to the casing B, and a cover frame A covered on the casing B. The cover frame A comprises two front protruding portions A2 respectively inserted into two retaining holes B1 on the casing B, and two longitudinal sliding ways A3 matched with two opposite lateral sides of the casing B. The casing B comprises two retaining holes B1 bilaterally disposed at a front side thereof, two horizontal sliding slots B3 respectively made on two opposite lateral sides, two sliding blocks B4 respectively moved in the horizontal sliding slots B3 and connected to the cover frame A, and two springs B6 respectively connected between the sliding slots B3 and the sliding blocks B4, and a connector B9 at the rear side for connection to a respective connector C3 at the rear side C2 of the mounting frame C. The handle has two protruding portions B21, which are respectively inserted into the retaining holes BI of the casing B to move the protruding portions A2 of the cover frame A backwards from the retaining holes B1 of the casing B when the handle B2 is turned from the vertical position to the horizontal position. This structure of drawer type hard diskdrive mounting box is still not satisfactory in function. The drawbacks of this structure of drawer type hard diskdrive are outlined hereinafter.

1. When the casing B is moved out of the mounting frame C, dust will enter the inside of the computer to contaminate the internal circuit and to affect the operation of the computer.

2. It is complicated to move the casing B out of the mounting frame C and to disconnect the cover frame A from the casing B.

3. If the handle B2 is driven to pull the casing B out of the mounting frame C when the lock is locked, the lock will be damaged.

4. When the casing B is removed out of the mounting frame C and carried by hand through the handle B2, the cover frame A tend to displace relative to the casing B.

SUMMARY OF THE INVENTION

The present invention has been accomplished to provide a drawer type hard diskdrive box assembly which eliminates the aforesaid drawbacks. It is one object of the present invention to provide a hard diskdrive box assembly which is simple in structure. It is another object of the present invention to provide a hard diskdrive box assembly which is easy and inexpensive to manufacture. It is still another object of the present invention to provide a hard diskdrive box assembly which is durable in use. According to one aspect of the present invention, the drawer type hard diskdrive box assembly comprises a mounting frame, a casing covered with a cover frame and slidably mounted in the mounting frame to hold a hard diskdrive, a handle pivoted to the front side of the casing for carrying by hand, wherein the mounting frame has two stop edges bilaterally disposed at the front side; the handle has two pins raised from two opposite ends thereof in reversed directions and stopped against the stop edges of the mounting frame, the pins being stopped against the stop edges of the mounting frame to force the casing outwards from the mounting frame when the front handle is turned counter-clockwise relative to the casing. According to another aspect of the present invention, the mounting frame has a spring-supported latch means which locks the handle when the casing is locked in the mounting frame by a lock, which is mounted in the mounting frame. According to still another aspect of the present invention, the mounting frame has a movable dust board, which is turned by spring means to the operative position to close the front side of the mounting frame when the casing is removed out of the mounting frame.

DETAILED DESCRIPTION OF THE PREFERRED EMBODIMENT

Referring to Figures from 3 to 13, a drawer type hard diskdrive box assembly in accordance with the present invention is generally comprised of a cover frame 1, a casing 2, and a mounting frame 3. The cover frame 1 is made from a flat, substantially U-shaped plate, having two longitudinal sliding slots 11 at two opposite sides slidably matched with two opposite lateral sides of the casing 2, and a front hook 12. The casing 2 is made of rectangular shape having two longitudinal sliding grooves 21 at two opposite lateral sides, an electric connector 22 at the rear side, a front retaining hole 24 at the front side in the middle for engagement with the front hook 12 of the cover frame 1, a front handle 23, and a front spring plate 25 outwardly upwards extended from the bottom of the front side in the middle. The front handle 23 has two opposite ends 231 pivotably connected to two opposite ends of the front side of the casing 2, two pins 232 outwardly raised from the two opposite ends 231 in reversed directions, and a recessed portion 233 at one end 231. The mounting frame 3 is a substantially U-shaped frame having two rails 31 longitudinally bilaterally disposed on the inside and moved in the sliding grooves 21 of the casing 2, an electric connector 32 at the rear side for connection to the electric connector 22 of the casing 2, two stop edges 33 bilaterally disposed at the front side for engagement with the pins 232 of the front handle 23, a dust board 34 retained to close the front side of the mounting frame 3 by a spring 35, a stop block 36 disposed at one side at an elevation approximately equal to the rails 31 for stopping the dust board 34 in a vertical position to close the front side of the mounting frame 3 when the casing 2 is moved out of the mounting frame 3, a lock 37 disposed above the stop block 36 for locking the casing 2 in the mounting frame 3, a latch assembly 38 mounted in a hole 381 adjacent to the lock 37. The latch assembly 38 comprises a latch 382 supported on a spring 383 and linked to the lock 37. When the front handle 23 is turned counter-clockwise relative to the casing 2, the pins 232 are respectively stopped against the stop edges 33 of the mounting frame 3 to force the casing 2 out of the mounting frame 3. When the casing 2 is removed from the mounting frame 3, the spring 35 automatically moves the dust board 34 to close the front side of the mounting frame 3. When the lock 37 is locked, the latch 382 is forced outwards by the spring 383 into engagement with the recessed portion 233 of the front handle 23 to stop the front handle 23 in place, and therefore the front handle 23 cannot be turned outwards for pulling by hand to move the casing 2 out of the mounting frame 3. The lock 37 has an actuating rod 371. When the lock 37 is unlocked, the actuating rod 371 is forced against the projecting portion 3821 of the latch 382, causing the latch 382 to disengage from the recessed portion 233 of the front handle 23. When the latch 383 is disengaged from the recessed portion 233, the spring plate 25 forces the front handle 23 outwards, and therefore the front handle 23 can be pulled by hand to carry the casing 2 out of the mounting frame 3.

As indicated, the drawer type hard diskdrive box assembly achieve various advantages as outlined hereinafter.

1. By turning the front handle 23 to force the pins 232 against the stop edges 33, the casing 2 is forced out of the mounting frame 3 and can be conveniently removed out of the mounting frame 3.

2. When the casing 2 is locked in the mounting frame 3 by the lock 37, the front handle 23 is simultaneously locked by the latch 382.

3. When the casing 2 is removed from the mounting frame 3, the front side of the mounting frame 3 is automatically closed by the dust board 34.

4. By forcing the front hook 12 of the cover frame 1 downwards, the front hook 12 is released from the front retaining hole 24 of the casing 2, and therefore the cover frame 1 can be conveniently disconnected from the casing 2.

While only one embodiment of the present invention has been shown and described, it will be understood that various modifications and changes could be made without departing from the spirit and scope of the invention disclosed.

I claim:

1. A drawer type hard diskdrive box assembly comprising: a rectangular casing and a substantially U-shaped cover frame for holding a hard diskdrive, said U-shaped cover frame having two longitudinal sliding slots slidably matched with two opposite lateral sides of said rectangular casing, said rectangular casing having an electric connector at a rear side thereof and a handle pivotably connected to a front side thereof, and a substantially U-shaped mounting frame having an electric connector at a closed rear side thereof for connection to the electric connector of said rectangular casing, two longitudinal rails bilaterally disposed within said mounting frame along opposite sides thereof and slidably engaged with longitudinal sliding grooves of said rectangular casing, a lock carried by said mounting frame for locking said casing in said mounting frame; wherein said mounting frame has two stop edges bilaterally disposed at a front side thereof, said handle having two pins raised from two opposite ends thereof in reversed directions and stopped against the stop edges of said mounting frame, said pins being stopped against the stop edges of said mounting frame, wherein, the handle is forcing said casing outwards from said mounting frame when said front handle is turned counter clockwise relative to said casing, said mounting frame further comprising a spring supported latch means linked to said lock for locking said front handle in place, said spring supported latch means including a first spring means to force the engagement with a recessed portion on said front handle to lock said front handle in place, or forcing the disengagement from the recessed portion of said front handle to permit said front handle to be pulled by hand when lock is disengaged.

2. The drawer type hard diskdrive box assembly of claim 1 wherein said casing further comprises a spring plate, which imparts an outward pressure to said front handle.

3. The drawer type hard diskdrive box assembly of claim 1 wherein said mounting frame further comprises a stop block at one side adjacent said lock, and a dust board retained by second spring means, across the open front of said U-shaped mounting frame said dust board being turned outwardly upwards by the second spring means and stopped in the vertical position to cover the front of said mounting frame when said casing is removed from said mounting frame.

4. The drawer type hard diskdrive box assembly of claim 1 wherein said casing has a front retaining hole; said cover frame has a front hook detachably hooked in the front retaining hole of said casing.

* * * * *